US009020341B2

United States Patent
Yamamoto

(10) Patent No.: US 9,020,341 B2
(45) Date of Patent: Apr. 28, 2015

(54) OPTICAL TRANSMISSION SYSTEM AND CONTROL SIGNAL TRANSMISSION METHOD

(71) Applicant: Fujitsu Limited, Kawasaki-shi (JP)

(72) Inventor: Tsuyoshi Yamamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 237 days.

(21) Appl. No.: 13/734,392

(22) Filed: Jan. 4, 2013

(65) Prior Publication Data

US 2013/0243440 A1    Sep. 19, 2013

(30) Foreign Application Priority Data

Mar. 19, 2012    (JP) ................. 2012-062899

(51) Int. Cl.
H04B 10/07    (2013.01)
H04B 10/25    (2013.01)
H04B 10/077    (2013.01)

(52) U.S. Cl.
CPC ........ *H04B 10/2504* (2013.01); *H04B 10/0773* (2013.01)

(58) Field of Classification Search
CPC ................................... H04B 10/0773
USPC .......... 398/30, 32–33, 154–155, 160
See application file for complete search history.

(56) References Cited

U.S. PATENT DOCUMENTS

| 5,581,386 | A | 12/1996 | Suzuki | |
|---|---|---|---|---|
| 6,690,891 | B1 * | 2/2004 | Le Sauze et al. | 398/154 |
| 6,769,044 | B2 | 7/2004 | Matsuzaki | |
| 8,280,261 | B2 * | 10/2012 | Castanon Avila et al. | 398/154 |
| 2002/0018259 | A1 * | 2/2002 | Hait | 359/123 |

FOREIGN PATENT DOCUMENTS

| JP | 05-37974 | 2/1993 |
|---|---|---|
| JP | 2003-32084 | 1/2003 |

* cited by examiner

*Primary Examiner* — Leslie Pascal
(74) *Attorney, Agent, or Firm* — Fujitsu Patent Center

(57) ABSTRACT

An optical transmission system includes at least a first optical link to transmit a first data signal as a part of a multi-lane signal and a second optical link to transmit a second data signal as another part of the multi-lane signal; on the transmission side, a reference clock is constantly applied to the first data signal of the first optical link, and a delay clock is applied to the second data signal responsive to a control signal on the second optical link; on the receiving side, the phase of a first clock signal detected from the first data signal received on the first optical link and the phase of a second clock signal detected from the second data signal received on the second optical link are compared, and the control signal is detected from the comparison result.

14 Claims, 17 Drawing Sheets

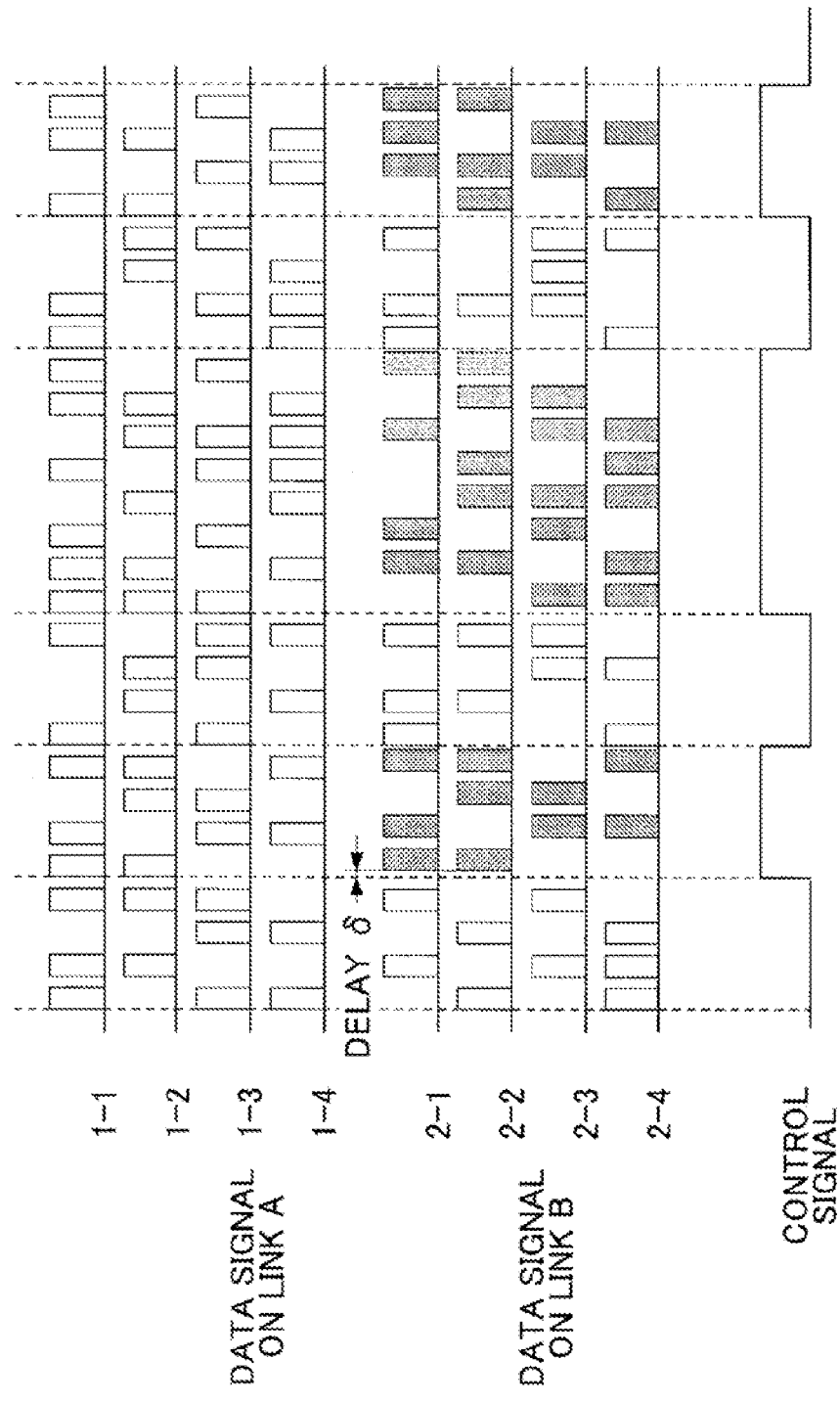

OPTICAL TRANSMISSION SYSTEM AND CONTROL SIGNAL TRANSMISSION METHOD

CROSS REFERENCE TO RELATED APPLICATIONS

This application is based upon and claims the benefit of priority of the prior Japanese Patent Application No. 2012-062899 filed on Mar. 19, 2012, the entire contents of which are incorporated herein by references.

FIELD

The embodiments discussed herein relate to an optical transmission system and a control signal transmission method.

BACKGROUND

In recent years, integration of virtual machines into a single server has been advancing owing to improvement of the processing ability of servers and enhancement in the virtualization environment. This leads to mass consumption of resources inside the server, such as memories, storages, input/output devices, etc., and it results in shortage of resources. To solve this problem, a technology for expanding external resources has been developed. Signal transmission between a server and external resources is becoming several tens of lanes in size, and the transmission rate is going to increase from the existing rate of around 10 Gbps to up to several tens Gbps in the near feature. It is unrealistic to carry out such a high-rate signal transmission via electric cables in terms of a transmission distance, electricity consumption, and the weight and the volume of cables. For this reason, optical fiber connections are promising.

When using an optical link to transmit bus signals such as PCI-Express Bus signals, control data are transmitted in addition to data signals. FIG. 1A and FIG. 1B illustrate conventional methods to transmit control signals together with optical data signals. In FIG. 1A, an extra lane for control signals is added to the data transmission lanes (optical fibers). With this configuration, control signals are transmitted through the dedicated lane, but the number of channels and the number of fibers of the optical link increase. Besides, the cost increases because of inefficient configuration, where the total number of lanes becomes five if the number of data lanes is four, and becomes nine if the number of data lanes is eight.

In FIG. 1B, a low-frequency signal is superimposed on a data signal. (See, for example, Patent Document 1.) With this method, the low-frequency signal becomes noise components for the high-frequency data signal, and the transmission properties deteriorate. The higher the data rate, the greater the influence of the property degradation is.

To reduce the number of internal wirings of an IC, a known technique indicates logical values using combinations of timings of transition edges of plural signals. (See, for example, Patent Document 2).

Patent Document 1: Japanese Laid-open Patent Publication No. H05-37974
Patent Document 2: Japanese Laid-open Patent Publication No. 2003-32084

SUMMARY

According to one aspect of the present disclosure, control information is superimposed on optical data signals while reducing influence on the optical data signals.

To achieve this, an optical transmission system includes
a first optical link to transmit a first data signal which is a part of a multi-lane signal via one or more lanes;
a second optical link to transmit a second data signal which is another part of the multi-lane signal via one or more lanes;
a reference clock supplier to constantly apply a reference clock to the first data signal on the transmission side of the first optical link;
a delay adding circuit to apply a delay clock according to a control signal to the second data signal on the transmission side of the second optical link;
a phase comparator to compare a phase of a first clock signal detected from the first data signal received on the receiving side of the first optical link and a phase of a second clock signal detected from the second data signal received on the receiving side of the second optical link; and
a control signal detector to detect the control signal from an output of the phase comparator.

According to another aspect of the present disclosure, a control signal transmission method is provided. The method includes
dividing optical signal transmission lanes into two or more links including at least a first optical link and a second optical link;
applying a reference clock constantly to a first data signal to be transmitted on the first optical link to cause the first data signal to be synchronized with the reference clock;
applying a delay clock according to a control signal to a second data signal to be transmitted on the second optical link to cause the second data signal to be synchronized with the delay clock according to the control signal;
on a receiving side, detecting a phase difference between a first clock signal detected from the first data signal and a second clock signal detected from the second data signal; and
detecting the control signal based upon the phase difference.

The object and advantages of the invention will be realized and attained by means of the elements and combinations particularly pointed out in the claims. It is to be understood that both the foregoing general description and the following detailed description are exemplary and explanatory and are not restrictive to the invention as claimed.

BRIEF DESCRIPTION OF DRAWINGS

FIG. 14A is a timing chart illustrating data signals received from optical link A and data signals received from optical link B, together with a control signal.

DESCRIPTION OF EMBODIMENTS

Figure 1A:
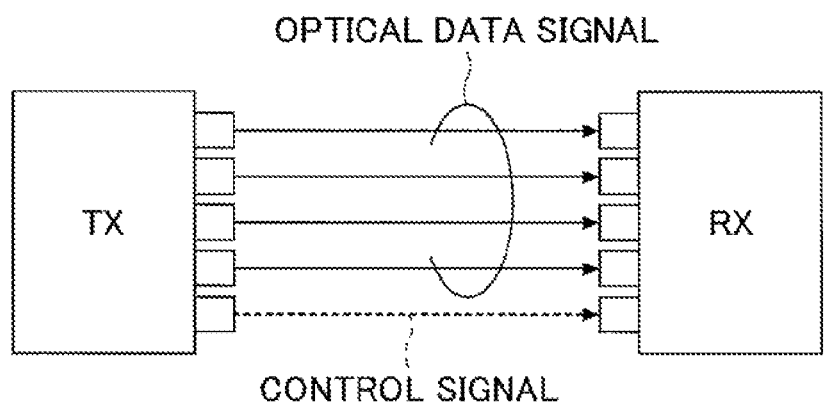
FIG. 1A illustrates a conventional method of transmission of control signals.
Figure 1B:
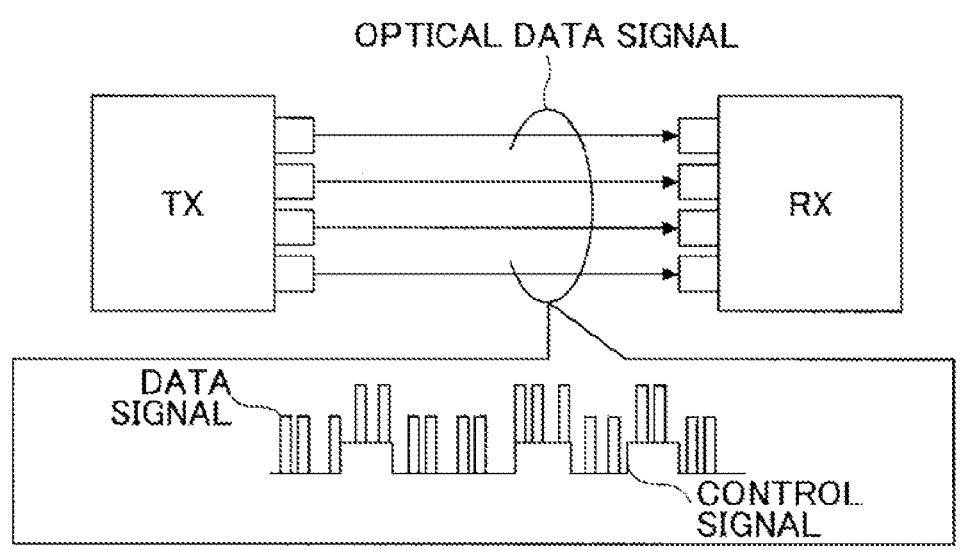
FIG. 1B illustrates another conventional method of transmission of control signals.

An optical transmission system and a control signal transmission method of the embodiments are explained below with reference to the attached drawings. FIG. 2 illustrates a basic configuration of the optical transmission system 100 according to an embodiment of the invention. In the optical transmission system 100, multi-lane signals transmitted on parallel optical links are divided into at least two groups. In the example of FIG. 2, 8-lane signals are separated into two, an optical link A (a first optical link 102) and an optical link B (a second optical link 103), but it is not limited to this example. The 8-lane signals may be split into 4 groups, each including two lanes, or a 16-lane signal may be split into two groups with 8 lanes each, or four groups with 4 lanes each.

One of the optical links is selected as a reference link. On the reference link, an optical data signal is transmitted synchronized with a reference clock. On the other lanes, optical data signals are modulated by providing or not providing a delay (i.e., a phase difference) corresponding to a control signal, and transmitted synchronized with a clock which contains a control signal.

On the receiving-side, a relative delay, i.e., a phase difference between the optical link A (the first optical link 202) and the optical link B (the second optical link 203) is detected to demodulate the control signal. For example, if there is no delay (or phase difference) between the signals received from the two links, the detection result corresponds to "0" of the control signal. If a delay over a prescribed threshold value is detected, the detection result corresponds to "1" of the control signal.

Figure 2A:
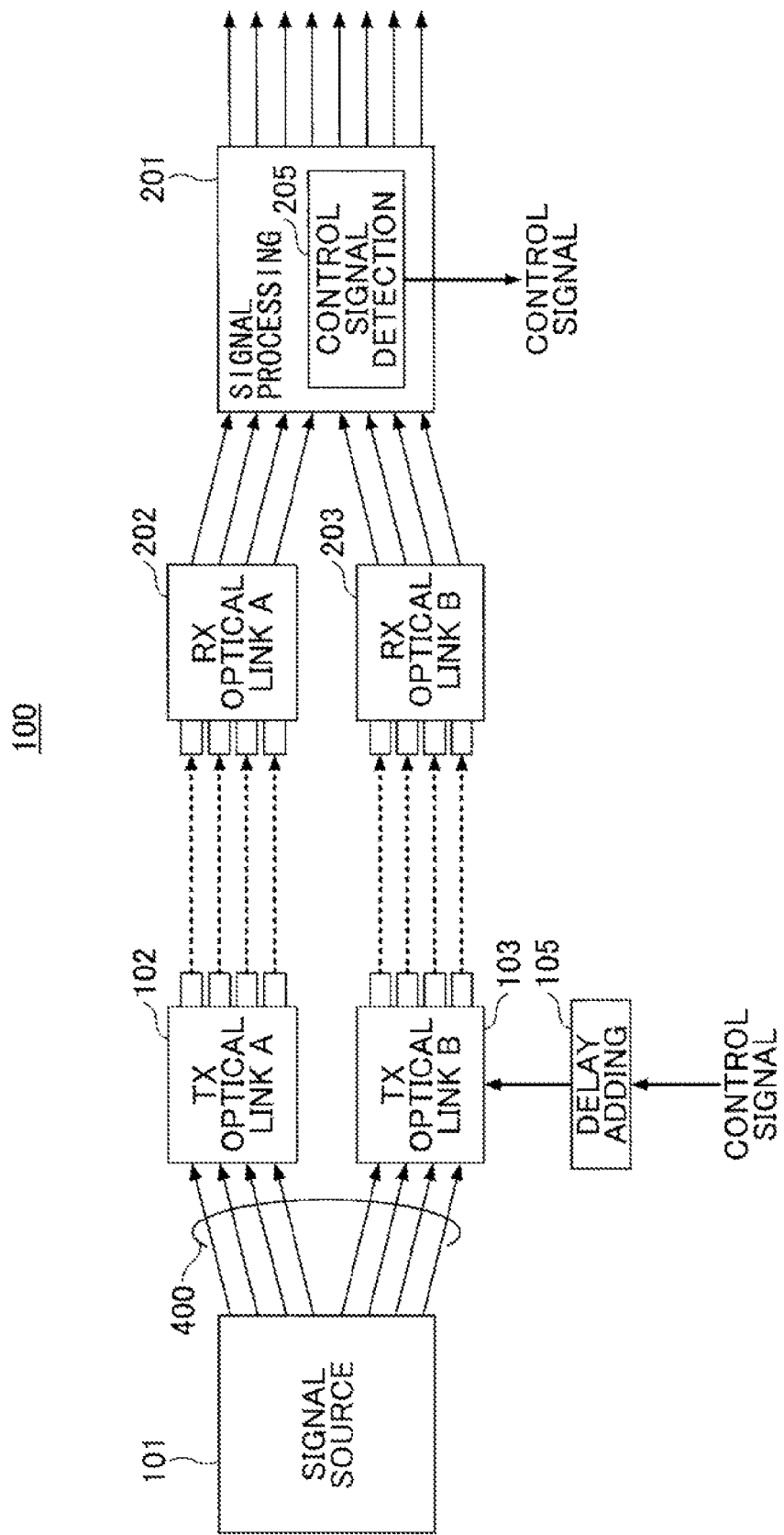
FIG. 2A illustrates a basic configuration of control signal transmission in an optical transmission system of the embodiment.

More specifically, in FIG. 2A, signals generated from a signal source 101 are distributed into multiple lanes to constitute multi-lane signals 400. A lane is composed of two differential signal pairs, one pair for transmitting data, the other for receiving it. A first part (a first data signal) of the multi-lane signals 400 is connected to the transmission-side optical link A (102). A second part (a second data signal) of the multi-lane signals 400 is connected to the transmission-side optical link B (103).

A delay representing the control signal is added to either one of the optical link A or the optical link B. In this case, a delay clock corresponding to the level of the control signal is produced by a delay adding circuit 105, and the delay clock is applied to the second data signal on the optical link B (103).

On the receiving side, a signal processor 201 includes a control signal detector 205. The control signal detector 205 compares the phases of the first data signal received from the receiving-side optical link A (202) and the second data signal received from the receiving-side optical link B (203) and detects the control signal from comparison result.

Figure 2B:
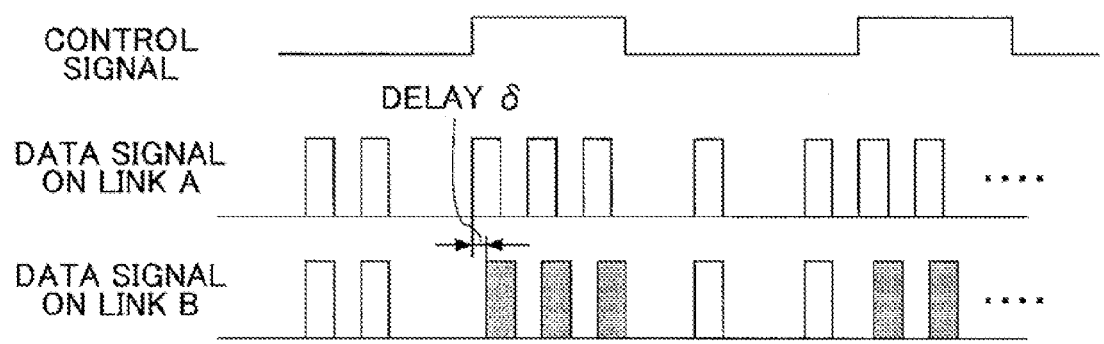
FIG. 2B is a timing chart illustrating a control signal, a link-A data signal, and a link-B data signal.

FIG. 2B illustrates timing of the control signal, the optical data signal of link A, and the optical data signal of link B. The frequency of the control signal is lower than the frequencies of the multi-lane data signals. For example, the frequency of the control signal is around one-tenth of the transmission rate (frequency) of the data signals. A predetermined delay 6 is provided to the optical data signals of the link B at the rising edge of the control signal.

Figure 3A:
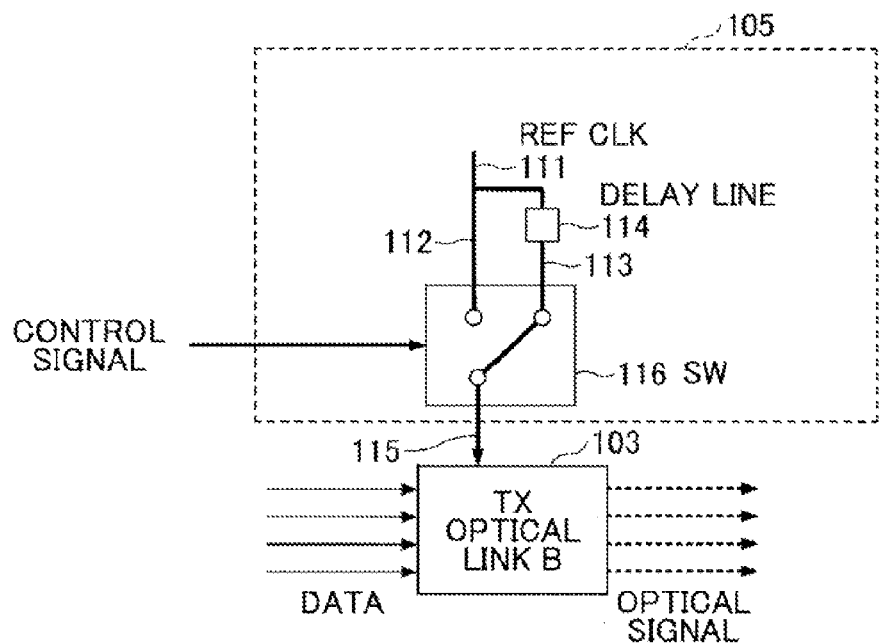
FIG. 3A illustrates an example of adding a delay which corresponds to the control signal on the transmission side of the optical transmission system of FIG. 2.

FIG. 3A illustrates an example of the delay adding circuit 105 of FIG. 2. The delay adding circuit 105 includes signal lines 111 and 112 which input reference clock signals, delay lines 114 and 113 which are connected in parallel to the signal line 112 to provide a predetermined delay, and a switch 116 for switching between the signal line 112 and the delay line 114. The switch 116 switches between the signal line 112 and the delay line 114 according to the value of the input control signal. A clock signal 115 to be applied to the transmission-side optical link B (103) changes depending on the connecting position of the switch 116.

Figure 3B:
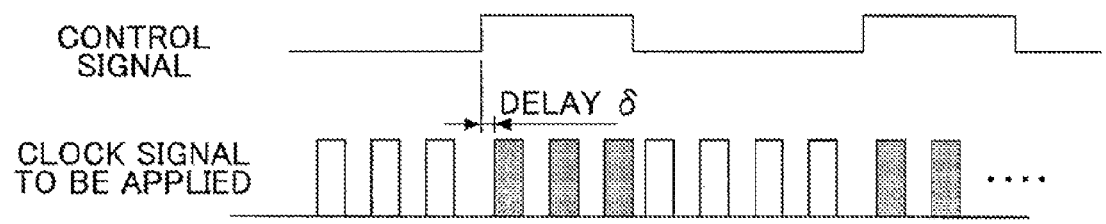
FIG. 3B is a timing chart illustrating a control signal and a clock signal to be applied.

FIG. 3B is a timing chart of the input control signal and the clock signal to be applied. The delay 6 is added to the reference clock at the rising edge of the control signal. In other words, the switch 116 is connected to the delay lines 113 and 114. Alternatively, the delay 6 is cleared at the falling edge of the control signal. In other words, the switch 116 is connected to the signal line 112. Since the control signal is at a lower frequency in comparison with the clock for the data signals, delay is applied to each of the multiple clock pulses during the high-voltage section of the control clock.

Figure 4:
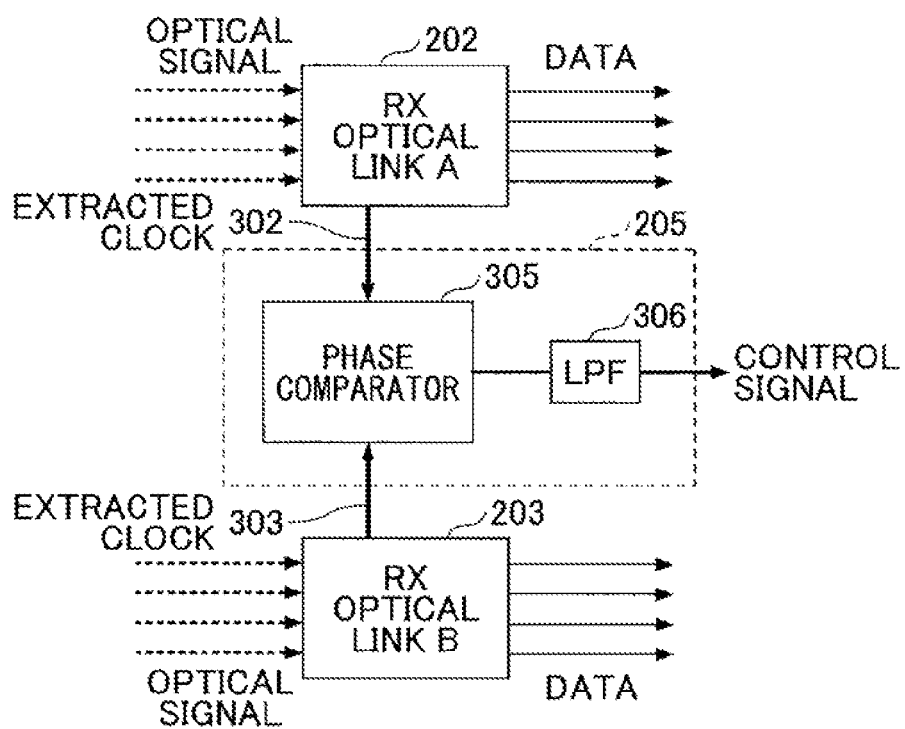
FIG. 4 illustrates an example of extracting the control signal on the receiving-side of the optical transmission system of FIG. 2.

FIG. 4 illustrates an example of the control signal detector 205 of FIG. 2. The control signal detector 205 includes a phase comparator 305 and a low pass filter 306. The receiving-side optical link A (202) extracts the clock signal from the received optical data signal using an appropriate method. This clock signal is a first clock signal 302. The first clock signal 302 corresponds to the reference clock applied on the transmission side. The receiving-side optical link B (203) extracts the clock signal from received optical data signal using an appropriate method. This clock signal is a second clock signal 303. The second clock signal 303 contains the information of the control signal in the form of delay, i.e., a phase difference.

The first clock signal 302 and the second clock signal 303 are input to the phase comparator 305, in which the phases of the two clock signals are compared to each other. The comparison result is input to the low pass filter 306 and the direct current components (low frequency components) are extracted. The output of the low pass filter 306 may be used as the control signal as it is. If the output of the phase comparator 305 does not include a delay, the control signal is demodulated as "0", while it is demodulated as "1" if a delay surpasses a specified threshold value.

Figure 5:
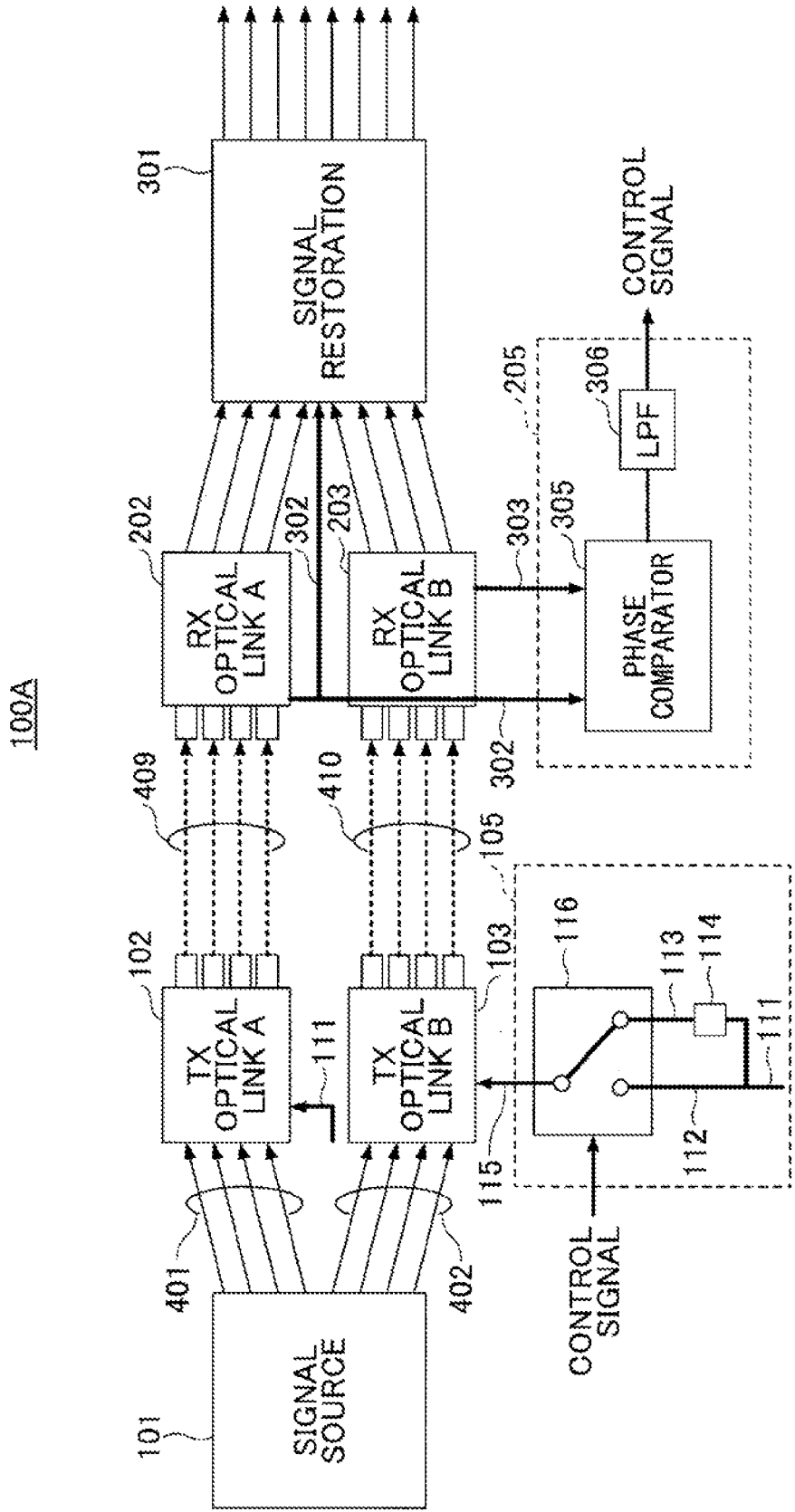
FIG. 5 illustrates an exemplified structure of the optical transmission system of FIG. 2.

FIG. 5 illustrates the overall structure of the optical transmission system 100A. Signals generated by the signal source 101 are distributed in the multiple lanes. The signals are split into a multi-lane signal group A as the first group 401 and a multi-lane signal group B as the second group 402 and connected to the corresponding transmission-side optical link A (102) and the transmission-side optical link B (103), respectively. To the transmission-side optical link A is applied a reference clock signal 111. To the transmission-side optical link B, a clock 115 is selectively input, switched between a delay clock signal 113 delayed by the delay line 114 upon application of the control signal and a clock signal 112 without delay. Optical signals 409 output from the transmission-side optical link 102 and optical signals 410 output from the transmission-side optical link 103 are transmitted through optical transmission paths.

The optical signals 409 received at the receiving-side optical link A (202) are converted into electrical signals and supplied to a signal restoration circuit 301 of the signal processor 201 (referring to FIG. 2). The optical signals 410 received at the receiving-side optical link B (203) are also converted into electrical signals and supplied to the signal restoration circuit 301. The first clock signal 302 extracted in the receiving-side optical link A is supplied to the phase comparator 305 and the signal restoration circuit 301. The signal restoration circuit 301 restores data by synchronizing the input data signals with the first clock signal 302.

The second clock signal 303 extracted in the receiving-side optical link B is supplied to the phase comparator 305. As mentioned above, the control signal representing control information is contained in the second clock signal 303 in the form of a signal delay. Therefore, the phase difference detected by the phase comparator 305 indicates the control information. The component having passed through the low pass filter 306 is used as the control information for the multi-lane signals 401 and 402. The outputs of the signal restoration circuit 301 are combined at a frame regenerating circuit (not illustrated) and restored to their original states of pre-multi-lane distribution.

Figure 6:
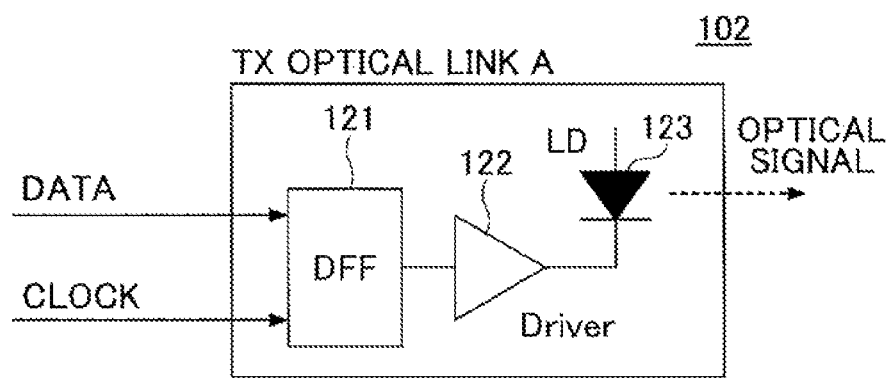
FIG. 6 illustrates an example of a transmission-side optical link of the optical transmission system of FIG. 5.

FIG. 6 illustrates an example of the transmission-side optical link A (102). The transmission-side optical link B (103) has a similar structure. Each of the transmission-side optical links 102 and 103 includes a delay flip-flop (DFF) 121, a driver 122, and a laser diode (LD) 123. Although only a single part of the transmission-side optical link is illustrated in FIG. 6 for the sake of convenience, as many parts as the number of lanes (for example, four lanes) are provided for the transmission-side optical link A, as well as for the optical link B.

Transmission data and a clock signal are input to the DFF 121. For the transmission-side optical link A (102), this clock signal is a reference clock signal 111. For the transmission-side link B (103), the clock signal is either one of a delay clock corresponding to the level of the control signal or a reference clock. The transmission data retained in the DFF 121 is output at the rising edge of the clock signal. An output of the DFF is connected to the input of the driver 122. The driver 122 drives and modulates the light beam emitted from the LD 123 with output data signals. As a result, optical signals with the control information superimposed in the form of delay between the reference clock for link A and the clock for link B are output from the transmission-side optical links 102 and 103.

Figure 7:
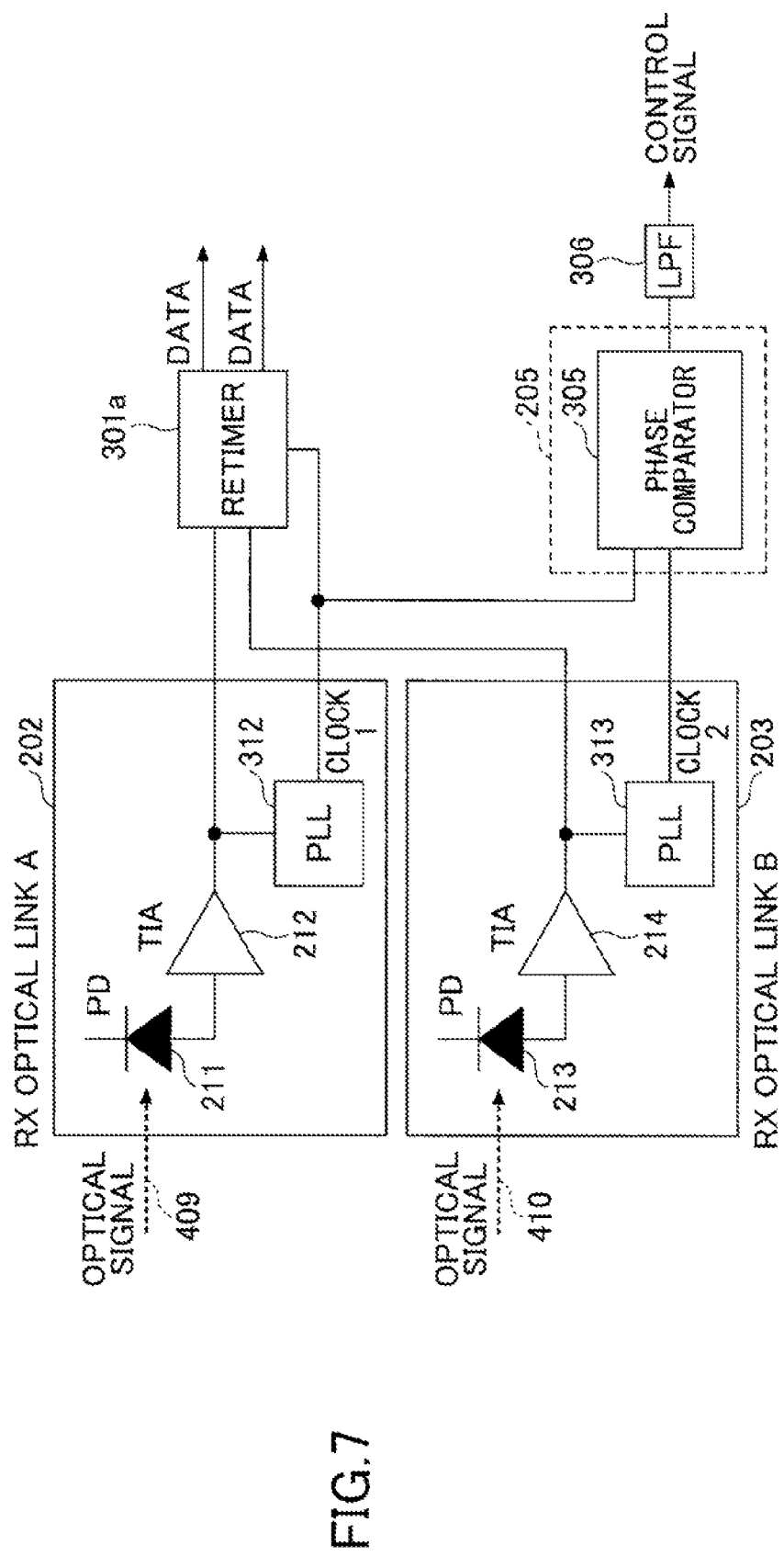
FIG. 7 illustrates an example of a receiving-side optical link with a control signal detector used in the optical transmission system of FIG. 5.

FIG. 7 illustrates a configuration example of receiving-side optical links 202 and 203. The receiving-side optical link 202 includes a photodetector (PD) 211 such as a photodiode, a transimpedance amplifier (TIA) 212, and a phase-locked loop (PLL) 312. The received optical signal 409 is converted into an electric current by the PD 211. The TIA 212 performs impedance transformation and amplification on the electric current to output a voltage signal. The voltage signal is supplied to a re-timer 301a and the PLL 312. The re-timer 301a works as the signal restoration circuit 301. The PLL 312 detects the first clock signal (clock 1) from the voltage signal.

The detected first clock signal is supplied to the re-timer 301a and the phase comparator 305.

The receiving-side optical link 203 includes a PD 213, a TIA 214, and a PLL 313. The received optical signal is converted to an electric current by the PD 213 and converted into a voltage signal by the TIA. The voltage signal is supplied to the re-timer 301a and the PLL 313. The PLL 313 detects a second clock signal (clock 2) to which delay corresponding to the control signal has been added. The second clock signal is supplied to the phase comparator 305.

The re-timer 301 restores the data signals by bringing the optical signals received at the optical link A and the optical link B in synchronization with the first clock signal detected by the PLL 312, and outputs the data signals. The phase comparator 305 compares the phases of the first clock signal and the second clock signal and detects the control signal from a comparison result. The LPF 306 may be inserted to extract the control signal.

In this manner, the second clock signal containing the delay is used to detect the control signal, and the first clock signal corresponding to the reference clock is used to restore the data signals. Thus, all the signals are set to be in phase eventually.

Figure 8:
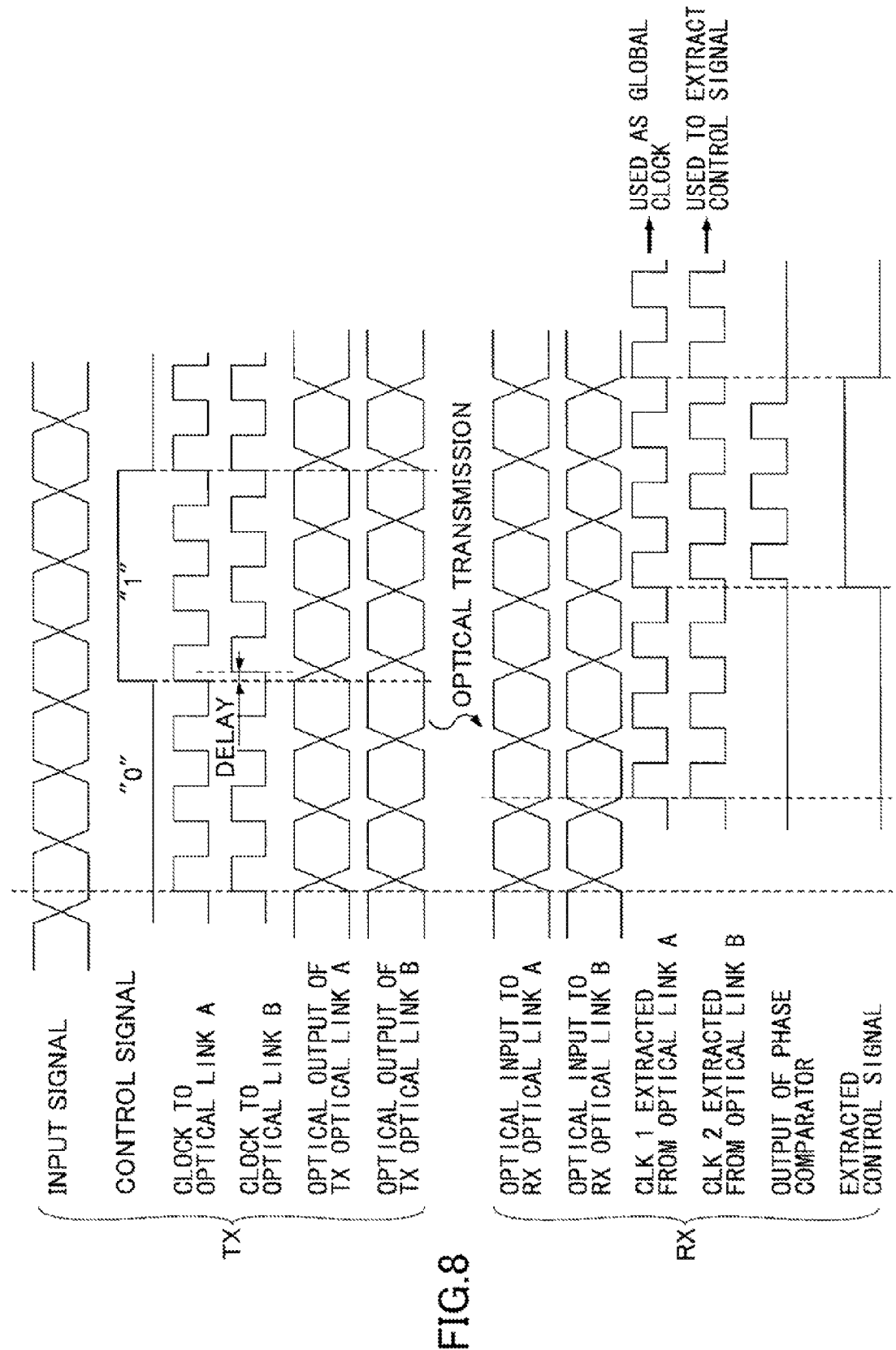
FIG. 8 is a timing chart illustrating signals used in the optical transmission system of FIG. 5.

FIG. 8 is a timing chart of the signals transmitted and received in the optical transmission system 100A of FIG. 5. On the transmission (TX) side, a low-frequency control signal is used together with the input signal. If the control signal is at a low potential during the period indicated as "0", the switch 116 of FIG. 5 is connected to the clock signal line 112 without delay. In this state, the clock applied to the optical link A and the clock applied to the optical link B rise at the same timing. The phases of the optical signals output from the transmission-side optical link A and the transmission-side optical link B are set to be the same.

When the control signal is at a high potential during the period indicated as "1", the switch 116 of FIG. 5 is switched to the delay clock lines 113 and 114 at the rising edge of the control signal. As a result, the rising edge of the clock applied to the optical link B is delayed for a certain period of time behind the rising edge of the reference clock applied to the optical link A. The phase of the optical signal output from the transmission-side optical link B is behind the phase of the optical signal output from the transmission-side optical link A.

When the control signal returns to the low potential (representing "0"), the switch 116 of FIG. 5 is switched back to the no-delay clock signal 112 at the falling edge of the control signal. Accordingly, the clock timing of the optical link B becomes in phase with the reference clock applied to the optical link A. The phases of the optical signals transmitted on the optical link A and the optical link B are in the same phase.

On the receiving side, the first clock signal detected at the receiving-side optical link A rises at constant intervals. The rising timing of the second clock signal detected at the receiving-side optical link B is delayed with respect to the first clock signal in certain sections. This is because the phase of the optical signal received at the optical link B is behind that of the optical signal received at the optical link A during the delay sections. The output of the phase comparator representing the comparison result between the phases of the first clock signal and the second clock signal is at a low potential, for example, if phase difference is not detected, and at a high potential if the phase difference exceeds a predetermined threshold level.

The low-frequency component is extracted from the output of the phase comparator 305 to detect the control signal having been superimposed on the data signal on the transmission side. The first clock signal is used as a global clock, and the second clock signal is used for the detection of the control signal. Since the transmission rate of the control signal is less at an order of magnitude than that of the data signal (e.g., about 1/10), the optical signal is in the steady state in or out of phase with respect to the reference clock once the clock applied to the transmission-side optical link B has instantaneously switched. Accordingly, detection of the control signal is performed in the stable manner on the receiving side.

Figure 9:
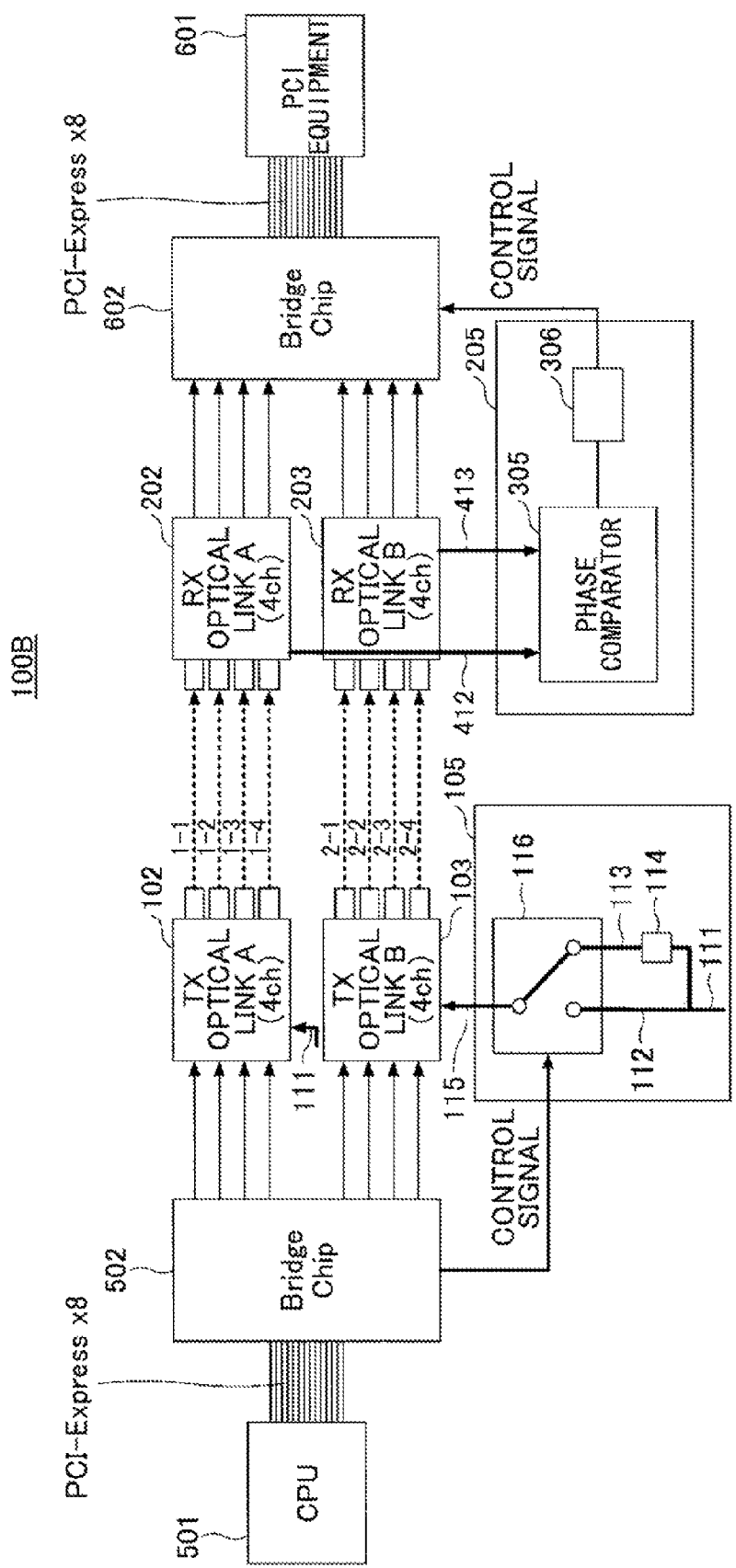
FIG. 9 illustrates an exemplified structure by which the optical transmission system of FIG. 5 is applied to PCI-Express.

FIG. 9 illustrates an optical transmission system 100B, which is a modification of the optical transmission system 100A. In the optical transmission system 100B, control signal superimposition is applied to transmission of PCI-Express Bus signals. A CPU 501 has, for example, an 8-lane PCI-Express output port. Data are distributed to multiple lanes (8 lanes) and serially transmitted. A bridge chip 502 converts the PCI-Express bus to another bus, e.g., a local bus, and outputs the data via multiple lanes. The 8-lane local bus is split into two groups, each comprising 4 lanes, and the respective groups are connected to the inputs of the transmission-side 4-channel optical link A (102) and the transmission-side 4-channel optical link B (103).

The bridge chip 502 supplies the PCI-Express control information (control signal) to the delay adding circuit 105. The operations of the delay adding circuit 105 are the same as those explained above in connection with FIG. 3 and FIG. 5. The switch 116 is regulated according to the control signal to control the delay to be added to the clock signal supplied to the transmission-side optical link B. For example, if the control signal is "1", a delay clock is generated and applied to the data signal. A reference clock is constantly supplied to the transmission-side optical link A.

On the receiving side, the optical signal (data signal) received at the receiving-side optical link A (202) is input to a bridge chip 602 via the local bus. The local bus signals are converted into PCI-Express Bus signals, and supplied to PCI equipment 601. Similarly, the optical signals (data signals) received at the receiving-side optical link B (203) are input to the bridge chip 602 via the local bus, converted into the PCI-Express Bus signals, and supplied to the PCI equipment 601.

A first clock signal 412 detected by the receiving-side optical link A and a second clock signal 413 detected by the receiving-side optical link B are supplied to the phase comparator 305. The phase comparator 305 compares the phases of the first clock signal and the second clock signal and outputs a comparison result. If the phase difference between the two clocks exceeds the predetermined threshold level, "1" is output. If a phase difference is not detected, "0" is output. The low pass filter 306 extracts a low frequency control signal from the output of the phase comparator 305. The control signal is supplied to the bridge chip 602 and used to control the PCI-Express data signal.

Figure 10:
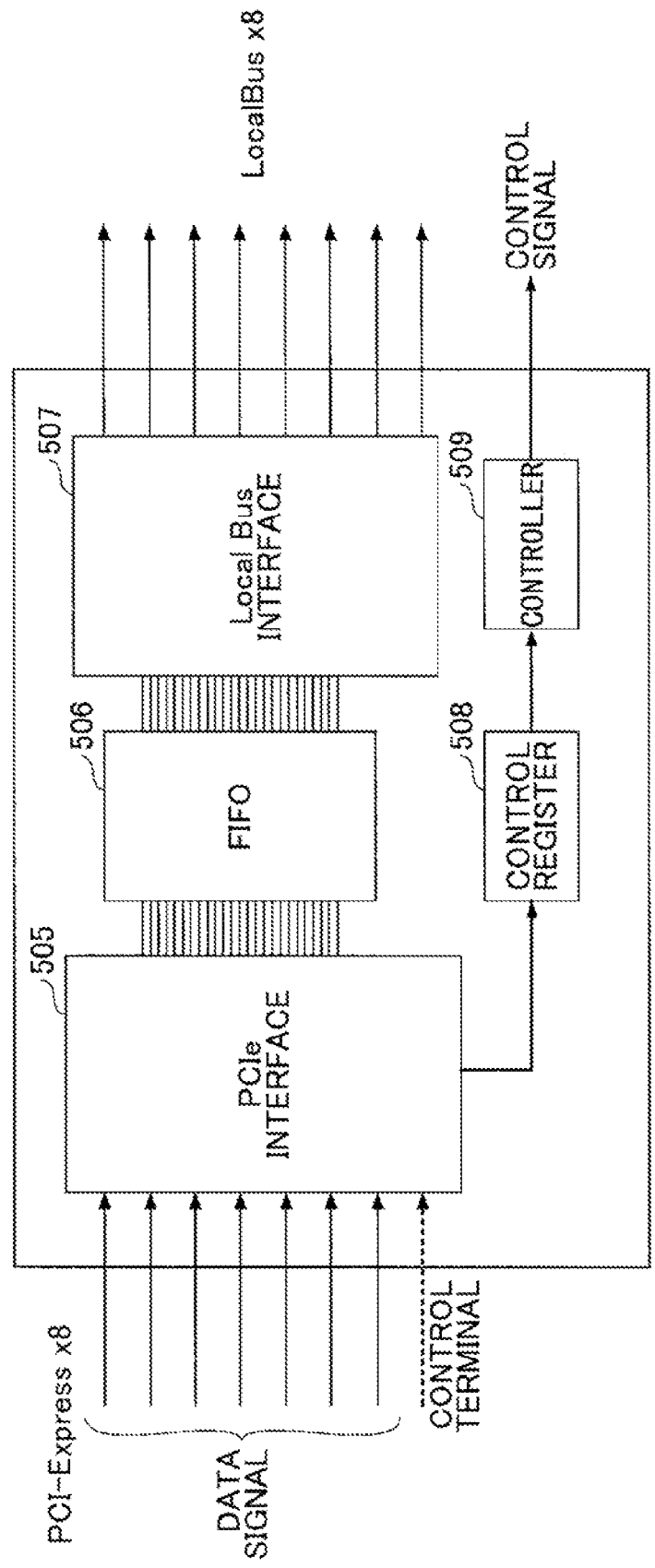
FIG. 10 illustrates an example of a bridge chip used in the optical transmission system of FIG. 9.

FIG. 10 illustrates an example of the bridge chip 502 used in FIG. 9. The bridge chip 502 includes a PCI-Express interface 505, a FIFO circuit 506, a local bus interface 507, a control register 508, and a controller 509. Data signals transmitted on the 8-lane PCI-Express bus are supplied to the FIFO circuit 506 via the PCI-Express interface 505. The input data are buffered, subjected to flow control, and sequentially output to the local bus interface 507. The local bus interface 507 outputs the data signals to the 8-lane local bus.

The PCI-Express interface 505 receives PCI-Express control information at a control terminal and hands it over to the controller 509 via the control register 508. The controller 509 generates and outputs the control signal. The control signal is supplied to the delay adding circuit 105 of FIG. 9.

Figure 11A:
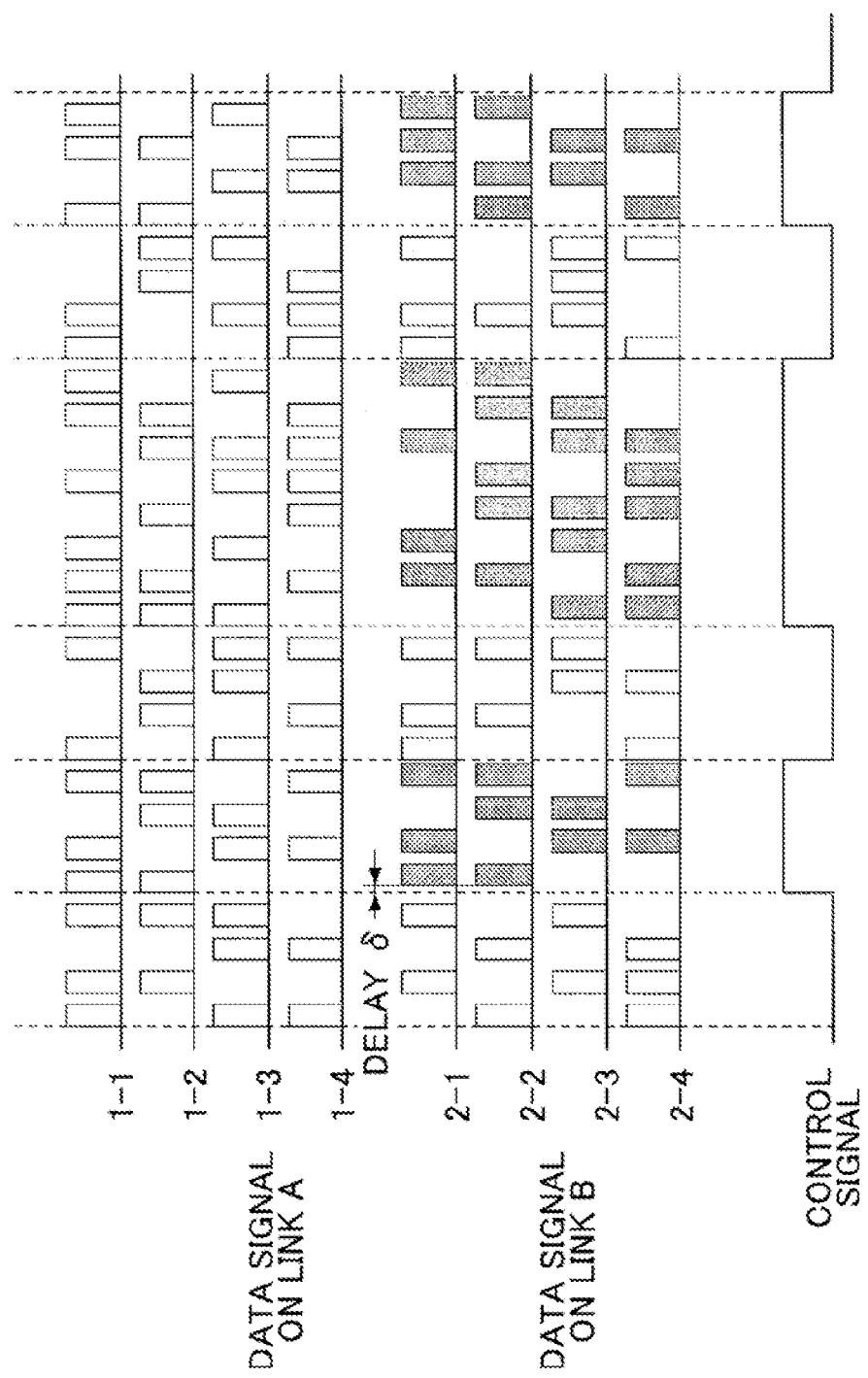
FIG. 11A is a timing chart illustrating a control signal and data signals transmitted on multiple lanes.
Figure 11B:
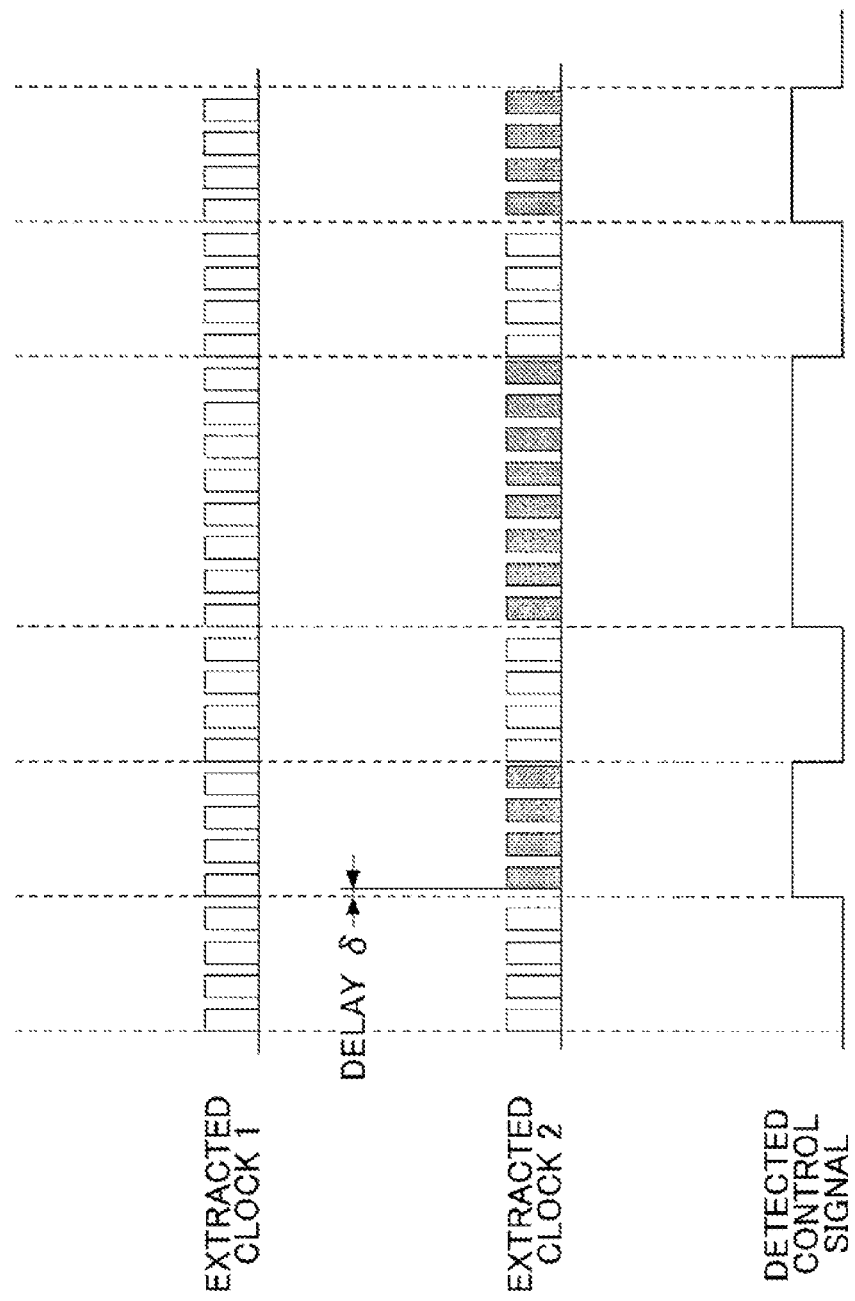
FIG. 11B is a timing chart illustrating extracted clock signal 1, extracted clock signal 2, and a detected control signal.

FIG. 11A illustrates optical data signals on the optical link A, optical data signals on the optical link B, and a control signal generated on the transmission side. FIG. 11B illustrates a first clock signal, a second clock signal, and a clock signal detected on the receiving side. In FIG. 11A, data pulses are generated on four lanes 1-1, 1-2, 1-3, and 1-4 of the optical link A, always in synchronization with the reference clock. On the four lanes 2-1, 2-2, 2-3, 2-4 of the optical link B, data pulses are generated synchronized with the reference clock during a low voltage section of the control signal, while data pulses delayed with respect to the reference signal are generated during a high voltage section of the control signal.

In FIG. 11B, the first clock signal detected from the 4-lane data signals of the optical link A constantly generates clocks at regular intervals. The second clock signal detected from 4-lane data signals of the optical link B is synchronized with the first clock signal of the optical link A in certain sections, but is behind the first clock signal of the optical link A in the rest of the sections. Those sections with synchronization between the first clock signal and the second clock signal represent a low potential of the control signal. Those sections with delay between the first clock signal and the second clock signal represents a high potential of the control signal. In this application to the PCI-Express serial transmission, the control signal can be transmitted, being superimposed on the data signal, without providing a dedicated lane for the control signal.

Figure 12:
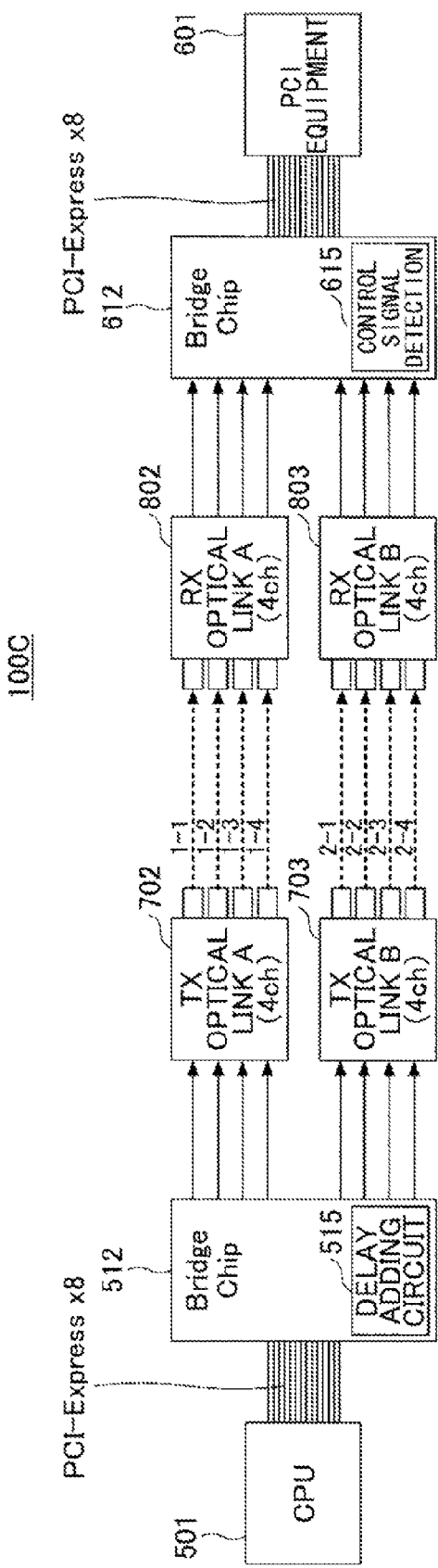
FIG. 12 illustrates a modification of the optical transmission system of FIG. 9.

FIG. 12 illustrates an optical transmission system 100C which is another modification of the optical transmission system 100A. The optical transmission system 100C has a delay adding circuit 515 in a bridge chip 512 on the transmission side. The optical transmission system 100C also has a control signal detector 615 in a bridge chip 615 on the receiving side. The bridge chip 512 split the 8-lane signals output from the local bus interface 507 (see FIG. 10) into two groups, each including four lanes. A reference clock is applied to the data signals of the first group, while a delay corresponding to the control signal is applied to the data signals of the second group. For example, if the control signal is "1", a delay is added to the reference clock, while if the control signal is "0", the reference clock is applied as it is to the second group.

The first group data signals which are synchronized with the reference clock are supplied to the transmission-side optical link A (702). The second group data signals which are synchronized with the delay clocks corresponding to control information are supplied to the transmission-side optical link B (703). With this arrangement, it is unnecessary to supply the clock signals to the transmission-side optical link A (702) and the transmission-side optical link B (703).

On the receiving side, the control signal detector 615 detects the first clock signal from the first group data signals and the second clock signal from the second group data signals, among the multi-lane local bus signals input to the bridge chip 612. The control signal detector 615 compares the phases of the first clock signal and the second clock signal and extracts a control signal from the comparison result. The control signal is used to control the data signal converted into the PCI-Express format.

Figure 13:
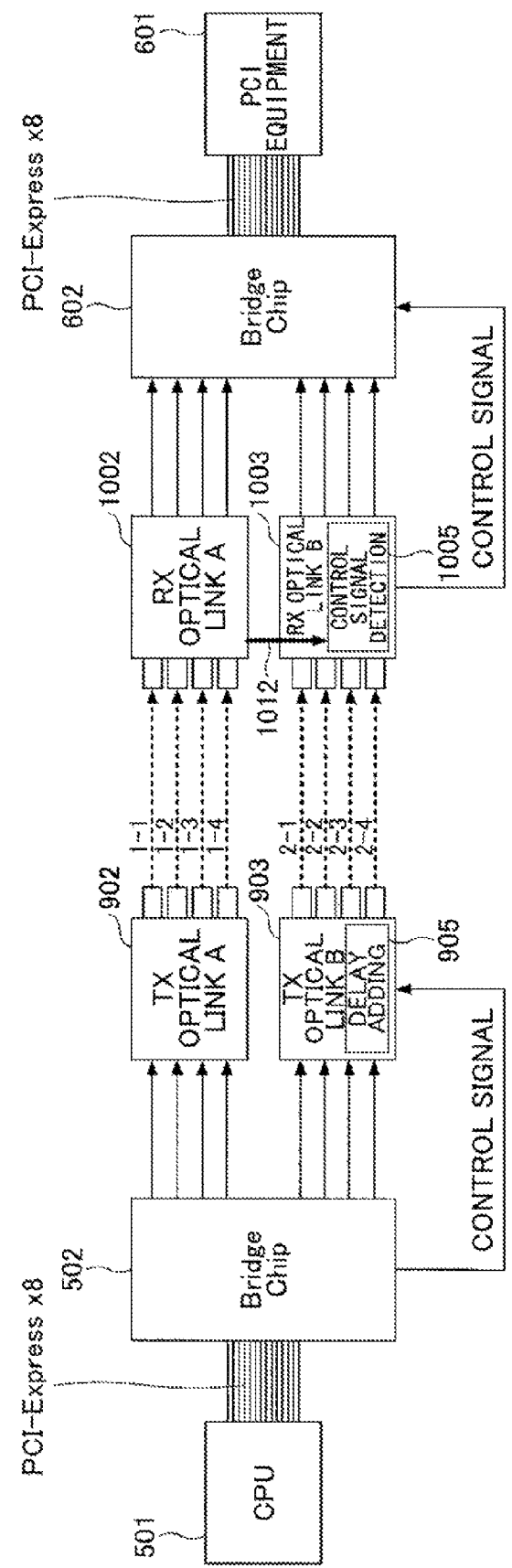
FIG. 13 illustrates another modification of the optical transmission system of FIG. 9.

FIG. 13 illustrates an optical transmission system 100D which is yet another modification of the optical transmission system 100A. The optical transmission system 100D has a delay adding circuit 905 on the transmission-side optical link B. A control signal detector 1005 is also provided on the receiving-side optical link B (1003).

The transmission-side optical link A (902) receives the reference clock as in FIG. 9 and brings the data signals synchronized with the reference clock. The transmission-side optical link B (903) applies either one of the delay clock or the reference clock to the data signals based upon the control signal supplied from the bridge chip 502.

The receiving-side optical link A (1002) detects the first clock signal 1012 from the received data signals and supplies the detected first clock signal to the control signal detector 1005 of the receiving-side optical link B (1003). The receiving-side optical link B (1003) detects the second clock signal from the received data signals. The control signal detector 1005 compares the phases of the first clock signal and the second clock signal and detects the control signal based upon the comparison result. The control signal is supplied to the bridge chip 602.

Figure 14B:
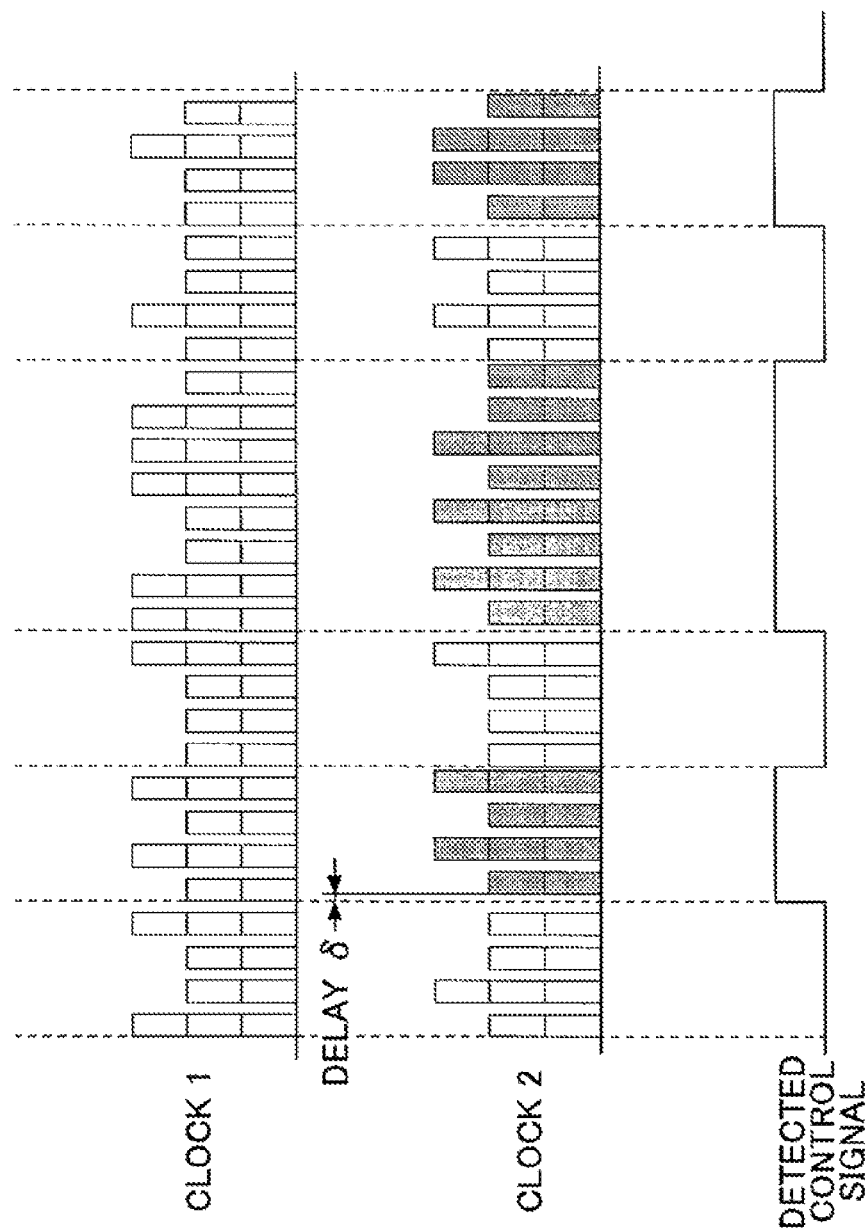
FIG. 14B is a timing chart illustrating clock signal 1 and clock signal 2 detected based upon the summation of the data signals on the optical link A and the optical link B, respectively, together with a detected control signal.

FIG. 14A and FIG. 14B illustrate extraction of the control signal by calculating a total sum of the data values of the signals on the parallel lanes of each optical link. For example, in the optical transmission system of FIG. 13, the data signals received from lanes 1-1, 1-2, 1-3, and 1-4 of the link A are those illustrated in the upper section of FIG. 14A. Then the clock signal illustrated in the upper section of FIG. 14B is detected by calculating the total sum of the data signals of the lanes 1-1 through 1-4 at each pulse. Similarly, the data signals received from lanes 2-1, 2-2, 2-3, and 2-4 of the link B are illustrated in the lower section of FIG. 14A. Then the clock signal illustrated in the lower section of FIG. 14B is detected by calculating the total sum of the data signals 2-1 through 2-4 at each pulse.

This arrangement is based upon the concept that even if the values of the data signals are "0" in many lanes, data "1" may appear on either lane at high probability. This arrangement allows stable detection of the clock signals, and the liability of the operations is improved.

With the above-described structures and methods of the embodiments, control signals can be transmitted together with the data signal using the appropriate number of lanes (optical fibers) corresponding to the number of data signals, without adding an extra lane. There is little influence on the high-rate data transmission property because only the signal phases are controlled. Besides, since delay is generated and applied on the link-by-link basis, the circuit structure is simplified.

In the embodiments the switch 116 is used to switch the path between the delay line for proving a delay clock and the no-delay line for providing a reference clock for the optical link B. However, a selector or other logic circuits may be used in place of the switch 116. In addition, the method illustrated in FIG. 14A and FIG. 14B to sum up the data values of the multiple lanes at each pulse may be modified so as to accumulate data signals in the time-axis direction in case all lanes have zero values. These modifications can achieve the same effect. Adverse influence on optical data signals can be reduced during transmission of data signals on which control information is superimposed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority or inferiority of the invention. Although the embodiments of the present inventions have been described in detail, it should be understood that the various changes, substitutions, and alterations could be made hereto without departing from the spirit and scope of the invention.

What is claimed is:

1. An optical transmission system comprising:
   a first optical link to transmit a first data signal which is a part of a multi-lane signal via one or more lanes;
   a second optical link to transmit a second data signal which is another part of the multi-lane signal via one or more lanes;
   a reference clock supplier to constantly apply a reference clock to the first data signal on the transmission side of the first optical link;
   a delay adding circuit to apply a delay clock according to a control signal to the second data signal on the transmission side of the second optical link;
   a phase comparator to compare a phase of a first clock signal detected from the first data signal received on the receiving side of the first optical link and a phase of a second clock signal detected from the second data signal received on the receiving side of the second optical link; and
   a control signal detector to detect the control signal from an output of the phase comparator.

2. The optical transmission system according to claim 1, wherein the delay adding circuit includes a switch or a selector to supply one of the delay clock and the reference clock to the second optical link.

3. The optical transmission system according to claim 1, further comprising:
   a first adder to sum up the first clock signals detected from the first data signals on said one or more lanes of the first optical link; and
   a second adder to sum up the second clock signals detected from the second data signals on said one or more lanes of the second optical link;
   wherein the phase comparator detects a phase difference between the summation of the first clock signals and the summation of the second clock signals.

4. The optical transmission system according to claim 1, wherein the control signal detector includes a low pass filter connected to an output of the phase comparator.

5. The optical transmission system according to claim 1, further comprising:
   a signal restoration circuit to restore the first data signal and the second data signal using the detected first clock signal.

6. The optical transmission system according to claim 1, further comprising:
   a first optical signal generator provided on the first optical link; and
   a second optical signal generator provided on the second optical link,
   wherein the delay adding circuit is connected to the second optical signal generator.

7. The optical transmission system according to claim 1, further comprising:
   a first optical signal generator provided on the first optical link; and
   a second optical signal generator provided on the second optical link,
   wherein the delay adding circuit is provided in the second optical signal generator.

8. The optical transmission system according to claim 1, further comprising:
   a first optical signal generator provided on the first optical link;
   a second optical signal generator provided on the second optical link; and a serial bus converting bride provided before the first optical generator and the second optical signal generator, wherein the delay adding circuit is provided in the serial bus converting bridge.

9. The optical transmission system according to claim 1, wherein the frequency of the control signal is lower than the frequency of the multi-lane signal.

10. A control signal transmission method comprising:
dividing optical signal transmission lanes into two or more links including at least a first optical link and a second optical link, each link including one or more lanes;
applying a reference clock constantly to a first data signal to be transmitted on the first optical link to cause the first data signal to be synchronized with the reference clock;
applying a delay clock according to a control signal to a second data signal to be transmitted on the second optical link to cause the second data signal to be synchronized with the delay clock according to the control signal;
on a receiving side, detecting a phase difference between a first clock signal detected from the first data signal and a second clock signal detected from the second data signal; and
detecting the control signal based upon the phase difference.

11. The control signal transmission method according to claim 10, wherein applying the delay clock includes
adding a delay to the reference clock according to the control signal to produce the delay clock, and
applying one of the delay clock and the reference clock to the second data signal by switching between the delay clock and the reference clock.

12. The control signal transmission method according to claim 10, further comprising:
setting multiple lanes in each of the first optical link and the second optical link;
calculating a first summation of the first clock signals detected from first data signals received from said one or more lanes of the first optical link;
calculating a second summation of the second clock signals detected from second data signals received from said one or more lanes of the second optical link; and
detecting the phase difference by comparing the first summation and the second summation.

13. The control signal transmission method according to claim 10, further comprising:
associating a first section of the second clock signal that contains the delay with one of a high potential and a low potential of the control signal; and
associating a second section of the second clock signal that does not contain the delay with the other of the high potential and the low potential of the control signal.

14. The control signal transmission method according to claim 10, further comprising:
on the receiving side, restoring the first data signal and the second data signal using the first clock signal.

* * * * *